United States Patent
Gomez et al.

[19]

[11] Patent Number: 5,815,073
[45] Date of Patent: Sep. 29, 1998

[54] EMERGENCY LIGHT AUTOMATIC LIGHTING SYSTEM FOR VEHICLES

[76] Inventors: Francisco Sanchez Gomez, Virgen de Africa 7., 28027 Madrid; Gonzalo Diosdado Antolin, Garcia Salazar 5., 28017 Madrid, both of Spain

[21] Appl. No.: 787,299

[22] Filed: Jan. 24, 1997

[30]      Foreign Application Priority Data

Jan. 25, 1996 [ES]  Spain ..................................... 9600178

[51] Int. Cl.⁶ ...................................................... G60Q 1/52
[52] U.S. Cl. .......................... 340/471; 340/436; 340/903
[58] Field of Search .................................... 340/471, 903, 340/429, 436, 440, 479; 180/274

[56]                    References Cited

U.S. PATENT DOCUMENTS

| | | | |
|---|---|---|---|
| 3,618,012 | 11/1971 | Shaw | 340/471 |
| 3,882,449 | 5/1975 | Bouchard et al. | 340/471 X |
| 4,723,078 | 2/1988 | Neuffer et al. | 340/471 X |
| 4,928,084 | 5/1990 | Reiser | 340/479 |
| 5,404,130 | 4/1995 | Lee et al. | 340/436 |
| 5,408,214 | 4/1995 | Chalmers et al. | 340/436 |
| 5,485,041 | 1/1996 | Meister | 340/471 X |
| 5,629,670 | 5/1997 | Pabla et al. | 340/479 |

*Primary Examiner*—Jeffery A. Horbass
*Assistant Examiner*—Anh La
*Attorney, Agent, or Firm*—Marshall, O'Toole, Gerstein, Murray & Borun

[57]                       ABSTRACT

The system is designed to instantaneously produce the activation of the emergency lamps included in the vehicle wherein the system is applied in the event of collision, sudden braking, overturning, etc. The system may be provided fully independently from the vehicle's standard emergency lights or else may form a complement thereof to be activated as a result of any of the abovementioned situations. The activation of the system is based on the movement of a piston in the event of collision, sudden stoppage or similar situations, closing a circuit that feeds the emergency lamps via remote-controlled switches associated to lamps on either side and via an interlocking remote-controlled switch which is deactivated through a master switch that is a part of the circuit itself.

5 Claims, 1 Drawing Sheet

EMERGENCY LIGHT AUTOMATIC LIGHTING SYSTEM FOR VEHICLES

The invention is related to an emergency light automatic lighting system for vehicles that is applicable to any type of vehicle either as a system totally independent from the emergency lights normally fitted in vehicles or as a complementary or combined system for the original emergency or intermittent lights.

At present, vehicle emergency lights for emergency signals or warnings (stoppage of the vehicle on a road normally used by other vehicles, stoppage as a result of breakdown, etc.) are activated only through a pushbutton operated by the driver, so that in the event of collision, accident or even very sudden braking said emergency lights will not be energized, thus giving rise to possible accidents in view that other drivers will fail to perceive any signal to warn them about an accident, a collision, sudden braking, etc., and will be late in reacting when faced with an unforeseen, unwarned situation.

In avoidance of such possible situations, which in many cases lead to accidents, the system of the invention is designed to be activated automatically in the event of any of the above occurrences.

More specifically, the system of the invention includes an electric circuit fed by the vehicle's battery or by a separate battery via a circuit activating emergency lights which may be independent from the vehicle's standard emergency system or may correspond precisely to said standard emergency lights.

In the first case, that is to say, when the system is independent from that of the vehicle's standard emergency lights, the circuit includes an activator piston which, in the event of collision, sudden braking or similar situations is moved by the force of inertia and closes the circuit, feeding a high sensitivity remote-controlled switch which causes the interlocking of the system, said remote-controlled switch being associated to two other remote-controlled switches for activating the emergency lights on both sides of the vehicle, said lights lighting up intermittently.

The circuit is complemented with a light to indicate that the system is activated and a system-deactivation switch controlled by the user at will, associated to an operational pushbutton.

In the second case, that is to say, when the system is complementary to the system formed by the vehicle's standard emergency lights, the circuit comprises only the activator piston, the switch and pushbutton, the high sensitivity remote-controlled interlocking switch and the pilot lamp indicating that the system is activated.

This system provides automatic lighting-up of the emergency lamps or other vehicle components, regardless of the nature, mechanism, location, etc., of the elements forming it, the system becoming energized in the event of circumstances or situations such as sudden stoppage, collision, overturning, skidding off the road, etc., involving the vehicle, namely all such circumstances requiring the vehicle to be seen, thus warning of an immediate emergency without loss of time in order that other road users can act accordingly to instantly avoid colliding with other vehicles or to provide the necessary help to the users of the damaged vehicles which have their emergency system on.

In order to complement the description given hereunder and help to provide a better understanding of the characteristics of the invention, a set of drawings is attached to this specification wherein the following is represented with a merely orienting, non-limiting character:

Figure 1:
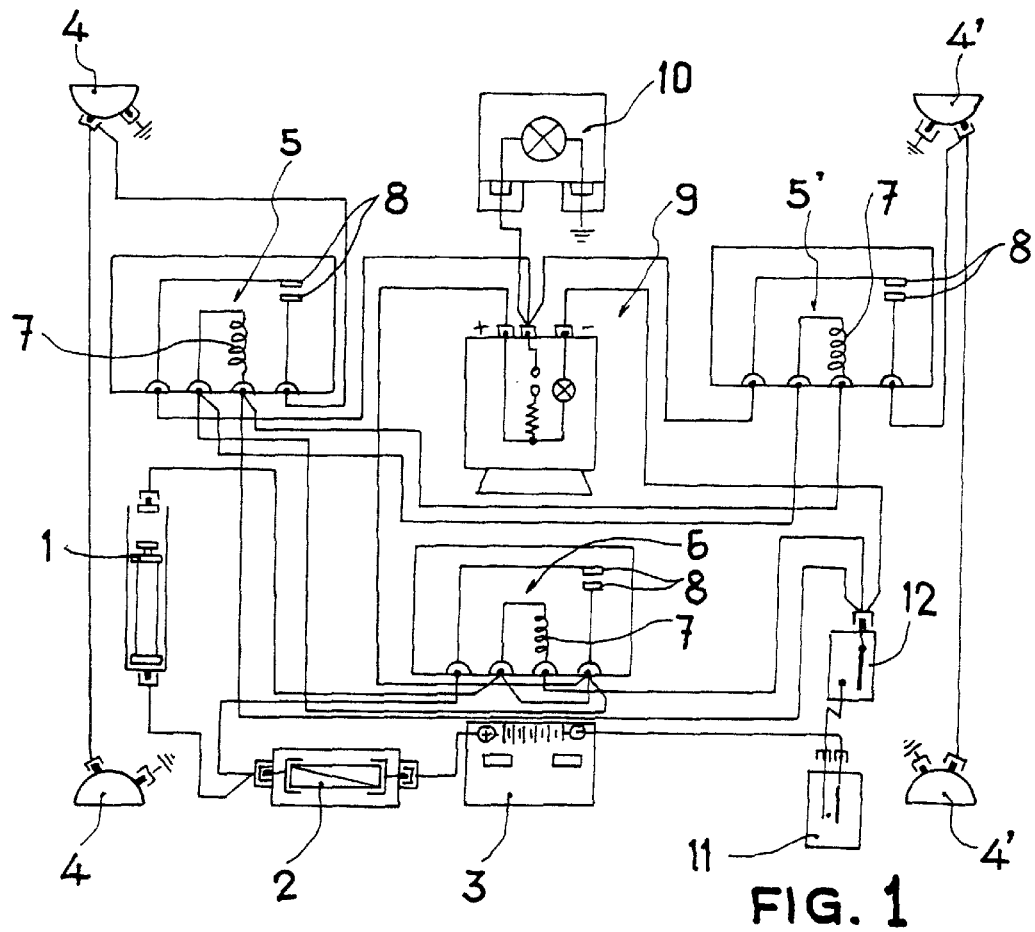
FIG. 1 shows an electric diagram corresponding to the inventive system in the version including the emergency lights or lamps.

As can be seen in these figures, specifically in FIG. 1, the inventive system comprises a circuit fitted with an activator piston (1) inside a cylinder which acts by inertia in the event of collision, overturning, sudden braking, etc., in a manner that the piston (1), when in a state of repose, occupies a position corresponding to the open circuit. Said cylinder (1) is fed through an air fuse (2) by a battery or storage cell (3) which may be that of the vehicle itself or else be provided as an autonomous or independent element. The circuit includes the corresponding emergency lamps (4) and (4'), respectively located on the right and left sides of the vehicle, which turn on when the circuit is closed by the action of cylinder (1), as previously stated, so that the energizing of said emergency lamps is conducted through a remote-controlled switch (5) and (5') after the interlocking of a high sensitivity switch (6) which, as in the case of the other switches, is fitted with an energizer coil (7) and the corresponding opening and closing contacts (8). The circuit further comprises an electronic component (9) which implements the intermittent function in one or the other set of emergency lamps (4) and (4'). It also comprises an internal pilot lamp (10) to indicate that the system is on.

The circuit includes a master switch (11) associated to a pushbutton (12) which allows the user to turn the overall system on and off at will, either because the user so wishes or in the event of repair or replacement of defective components.

Figure 2:
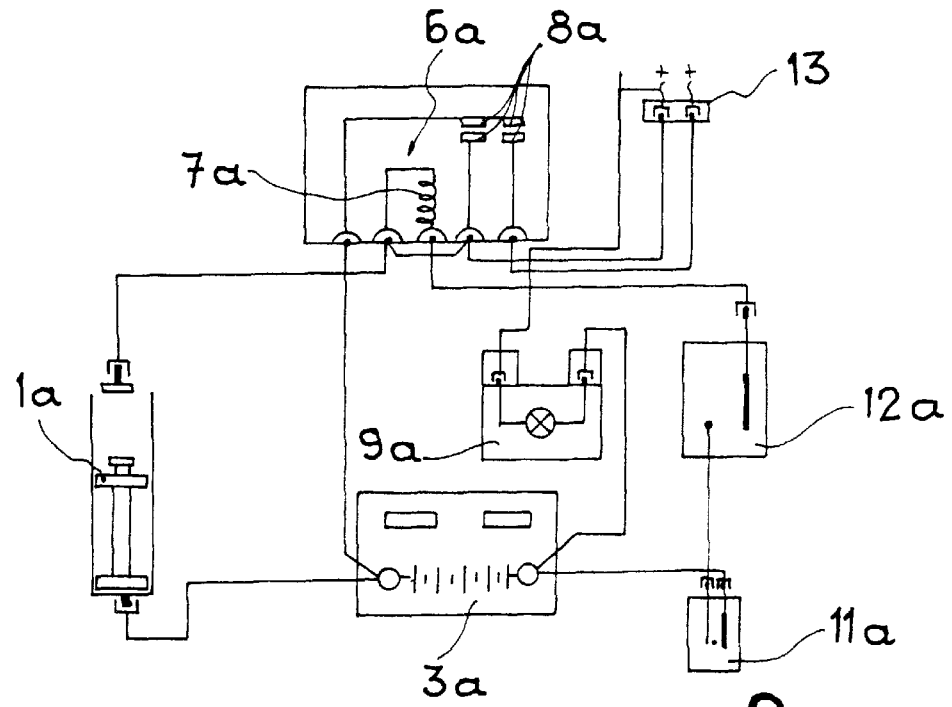
FIG. 2 shows the system's electric diagram in the version in which it is part of the standard emergency system included in the vehicle wherein it is applied.

FIG. 2 shows the system in the form of a complement to the vehicle's standard emergency lights. Said figure shows a circuit comprising the activator piston (1a), the power storage cell or battery (3a), and the high sensitivity remote-controlled switch (6a) with its coil (7a) and contactor (8a); it also comprises the internal pilot lamp (10a), the master switch (11a) associated to pushbutton (12a), and the vehicle's standard intermittent lamp outlet (13), the overall function and purpose of which is the same as that of the system shown in FIG. 1.

It should be added that the activator piston may be replaced by a mercury switch, a ball switch or a mechanical device providing a similar function.

We claim:

1. For use in a vehicle, an automatic emergency lighting system comprising:

an emergency lamp;

means for developing a signal in response to deceleration of the vehicle having a magnitude above a predetermined level;

a high sensitivity switch having a first inductive coil in communication with the signal developing means and two contacts associated with the first inductive coil, the contacts being adapted to close an energization circuit in response to energization of the first inductive coil by the signal from the signal developing means;

an intermittent signal generator for selectively energizing the emergency lamp of the vehicle; and, a remote-controlled switch having a second inductive coil in communication with the contacts of the high sensitivity switch and two contacts associated with the second inductive coil, the contacts of the remote-controlled switch being located to couple the intermittent signal generator to the emergency lamp in response to energization of the second inductive coil;

wherein when the contacts of the high sensitivity switch close the energization circuit, the second inductive coil is energized thereby causing the contacts of the remote control switch to couple the intermittent signal generator to the emergency lamp.

2. An automatic emergency lighting system as defined in claim 1 further comprising:

a second emergency lamp; and a second remote-controlled switch having a third inductive coil in communication with the contacts of the high sensitivity switch and two contacts associated with the third inductive coil, the contacts of the second remote-controlled switch being located to couple the intermittent signal generator to the second emergency lamp in response to energization of the third inductive coil.

3. An automatic emergency lighting system as defined in claim 1 wherein the signal developing means comprises an inertia switch including a housing and a movable mass adapted for movement within the housing from a first to a second position in response to decelerations of the vehicle having magnitudes above the predetermined level, wherein the movable mass closes a circuit to develop the signal when in the second position, and the movable mass returns to the first position when the deceleration falls below the predetermined level.

4. An automatic emergency lighting system as defined in claim 1 further comprising a master switch for selectively activating and deactivating the system.

5. An automatic emergency lighting system as defined in claim 4 further comprising an internal pilot lamp to provide a visual indication that the system is activated.

* * * * *